(12) United States Patent
Howard

(10) Patent No.: US 7,396,567 B2
(45) Date of Patent: Jul. 8, 2008

(54) WEATHERED STONE AND THE MANUFACTURING METHOD THEREOF

(76) Inventor: Sean Howard, 355 Commercial Park Dr., Fairhope, AL (US) 36532

( * ) Notice: Subject to any disclaimer, the term of this patent is extended or adjusted under 35 U.S.C. 154(b) by 278 days.

(21) Appl. No.: 11/063,083

(22) Filed: Feb. 22, 2005

(65) Prior Publication Data

US 2005/0186362 A1 Aug. 25, 2005

Related U.S. Application Data

(60) Provisional application No. 60/545,486, filed on Feb. 19, 2004.

(51) Int. Cl.
*B05D 5/00* (2006.01)
*B05D 3/12* (2006.01)
(52) U.S. Cl. .................. 427/403; 427/289; 427/378; 156/60
(58) Field of Classification Search ............... None
See application file for complete search history.

(56) References Cited

U.S. PATENT DOCUMENTS

| 1,807,335 | A | * | 5/1931 | Stans et al. ............ 52/710 |
|---|---|---|---|---|
| 3,924,037 | A | | 12/1975 | Sullivan |
| 4,868,018 | A | | 9/1989 | Schiffer |
| 4,902,534 | A | | 2/1990 | Miller |
| 4,956,030 | A | | 9/1990 | Baskin |
| 5,167,991 | A | | 12/1992 | Lowe |
| 5,634,307 | A | | 6/1997 | Larriberot et al. |
| 6,237,294 | B1 | | 5/2001 | Rygiel |
| 6,726,864 | B2 | | 4/2004 | Nasr et al. |
| 6,810,632 | B2 | * | 11/2004 | Ringness ............ 52/314 |
| 2002/0100241 | A1 | | 8/2002 | Rygiel |
| 2004/0003561 | A1 | | 1/2004 | Ringness |

FOREIGN PATENT DOCUMENTS

| DE | 19940219 | 10/2001 |
|---|---|---|
| JP | 06100351 A | 12/1994 |
| JP | 2001323630 A | 11/2001 |
| WO | WO 02/094737 A1 | 11/2002 |

* cited by examiner

*Primary Examiner*—William Phillip Fletcher, III
(74) *Attorney, Agent, or Firm*—Dykema Gossett PLLC

(57) ABSTRACT

An improved weathered stone panel is provided that is strong and durable, but flexible enough to accommodate curved surfaces, is suitable for water-based applications, and is lighter and less costly to ship while still maintaining the aesthetically pleasing smooth texture of the panel. The improved method for manufacturing a weathered stone panel includes preparing a base mixture comprising wood glue and plaster of paris and applying the base mixture to a substrate. The method further includes cutting the substrate to create panels of a desired size, applying light air movement to the panels until the panels are dry, applying an acrylic base to the panels, applying light air movement to the panels until the panels are dry, cutting the panels to preferred sizes, manipulating the panels by hand until at least one crack is created in each panel, applying a glaze to the panels for coloring, and finally drying the panels.

18 Claims, 3 Drawing Sheets

WEATHERED STONE AND THE MANUFACTURING METHOD THEREOF

CROSS-REFERENCE TO RELATED APPLICATIONS

This application claims the benefit of U.S. Provisional Patent Application No. 60/545,486 filed Feb. 19, 2004, hereby incorporated by reference in its entirety.

BACKGROUND OF THE INVENTION a. Field of Invention

The invention relates generally to stone for construction and the like, and, more particularly to weathered stone and the manufacturing method thereof.

b. Description of Related Art

It may be desirable in the construction industry to simulate the look of aged materials, such as weathered stone panels, natural stone, or ceramic tiles for architectural and aesthetic purposes. While materials may exist for use as decorative wall coverings or exterior finishing for walls, there exists a need for panels that may be used in other applications in addition to wall coverings. For example, it may be advantageous to produce a material with equivalent strength and durability, but sufficient flexibility for application to curved surfaces, in order to be used in connection with floors, countertops, shower stalls, and furniture.

Conventional designs for weathered stone and manufacturing methods have a number of deficiencies. For example, current base mud mixtures used to manufacture weathered stone may not produce weathered stone with sufficient strength and durability. Attempts to alter the composition of the base mud mixture to improve the strength, durability, and flexibility of the final product have resulted in undesirable consistencies, for example, producing a liquid effect on the base mud mixture during manufacturing and hampering drying. Furthermore, the thickness of the base mud mixture may prevent the weathered stone from wrapping around corners during installation without continuing to crack. In addition, conventional designs may not be adapted for use in water applications and some designs may require the application of multiple layers of a base composition to create the desired look of aged material. In addition, the standard weight sheet rock compound that provides the desired smoothness to the product is extremely heavy, resulting in a heavy final product with expensive shipping costs.

The inventors herein have recognized a need for weathered stone and a manufacturing method thereof that will minimize and/or eliminate the above-identified deficiencies.

SUMMARY OF THE INVENTION

The present invention provides a method of manufacturing a simulated stone panel, the method including preparing a base mixture comprising wood glue and plaster of paris and applying the base mixture to a substrate. The inventive method may further include: cutting the substrate to create panels of a desired size, applying light air movement to the panels until the panels are dry, applying an acrylic base to the panels, applying light air movement to the panels until the panels are dry, cutting the panels to preferred sizes; manipulating the panels by hand until at least one crack is created in each panel, applying a glaze to the panels for coloring, and drying the panels.

For the method described above, the light air movement may be applied at no more than approximately 65% humidity and no less than approximately 50° F. The base mixture may include lightweight sheet rock compound, or alternatively, standard weight sheet rock compound. The base mixture may include the following ingredients in about the following ratio: approximately 1 gallon wood glue: approximately 7 gallons lightweight sheet rock compound: approximately 7 gallons standard weight sheet rock compound: approximately 1 quart powdered plaster of paris. The substrate may include woven cotton fabric. The base mixture may be applied to the substrate at a thickness of about 0.0156 to 0.1 inches. The step of applying the base mixture to the substrate may further include the substeps of: feeding a roll of the substrate through a first paste-well machine at a first pressure for pushing the base mixture into the substrate; feeding the roll of the substrate through a second paste-well machine at a second pressure, the second pressure lower than the first pressure, for achieving a desired thickness of the base mixture on the substrate; and applying pressure to the substrate by hand with a trowel. The acrylic base may include MINIWAX brand polycrylic semi-gloss. The desired size may be less than or equal to approximately 40"×108". The glaze may include: oil base paint, mineral spirits, paint conditioner, and polyurethane. The step of applying a glaze to the panels for coloring may further include the substeps of: applying the glaze with a rag; using a stippling brush to work the glaze into the cracks; and using a clean rag to wipe off the glaze.

The present invention also provides a method of installing a stimulated stone panel produced by the method described above on a floor or countertop. The method may include applying a glue to the panel, the glue including about 90% GLASCOL C-47 from Ciba Specialty Chemicals and about 10% Flotrol from Home Depot; applying the panel to the floor or countertop; and applying a clear coating to the panel for sealing the product, the clear coating comprising about 95% GLASCOL C-47 from Ciba Specialty Chemicals and about 5% Trimethyl pentanediol monoisobutrate.

The invention yet further provides a simulated stone panel produced by applying a base mixture comprising wood glue, plaster of paris, and lightweight sheet rock compound to a fabric substrate.

Weathered stone and the manufacturing method thereof in accordance with the present invention are advantageous as compared to existing weathered stone and manufacturing methods thereof. First, the addition of wood glue, such as ELMER'S® or ELMER'S PROFESSIONAL®, to the base mud mixture gives the weathered stone strength and durability. In particular, wood glue enables greater adhesion of the base mud mixture to a fabric substrate when the base mud mixture is coated on the substrate. The improved adhesion makes the weathered stone more stable during installation. Because the wood glue softens during installation, the wood glue allows the product to be pliable. Second, the addition of plaster of paris to the base mud mixture offsets the liquid effect that the wood glue has on the composition during manufacturing and improves the workability of the base mud mixture by helping the panels to dry faster. Third, by utilizing a thinner layer of base mud mixture, in particular from about 0.0156 to 0.1 inches thick, the final product may be wrapped around corners during installation without resulting in undesired cracking. Fourth, an epoxy coating may be applied to the weathered stone so that it may be suitable for water-based applications, such as shower stalls. Fifth, only a single layer of base composition must be applied to the product to achieve the desired look, resulting in a less complex, less time-consuming, and less expensive process. Sixth, by using lightweight sheet rock, in addition to standard weight, the final product is lighter and less expensive to ship while sufficient smoothness to the texture of the final product is maintained.

These and additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE INVENTION

Figure 1:
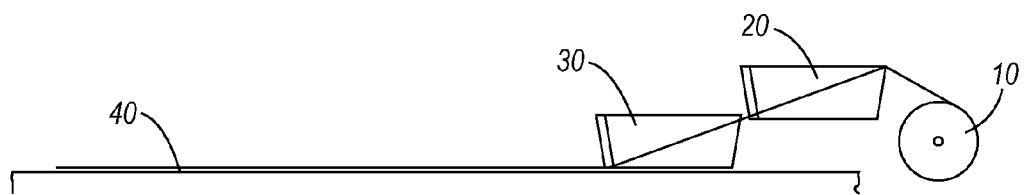
FIG. 1 is an illustrative view of the steps for base mud mixture application to a fabric substrate.
Figure 2A:
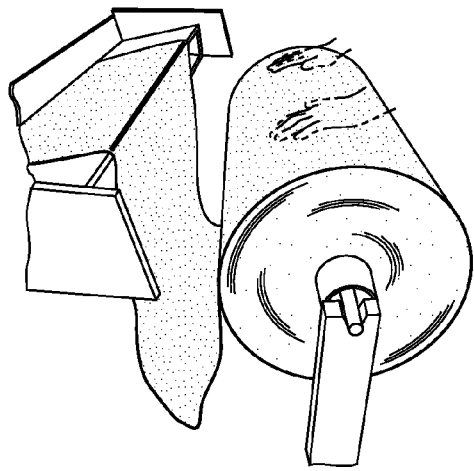
FIG. 2 is an illustrative view of some of the stages of preparing a stone panel in accordance with the present invention: (a) roll of fabric substrate; (b) a PASTE-WELL machine; (c) pulling fabric substrate through PASTE-WELL machine; (d) applying texture; (e) applying texture; (f) trimming excess; (g) sliding panel into rack; (h) letting panels dry in racks under light air movement; (i) spraying panels with acrylic; and (j) cutting panels to size.
Figure 2B:
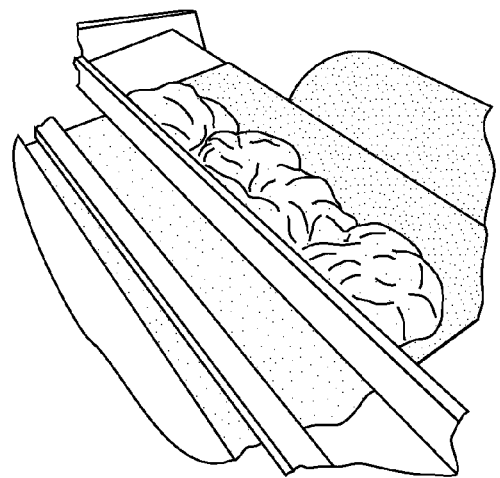
Figure 2C:
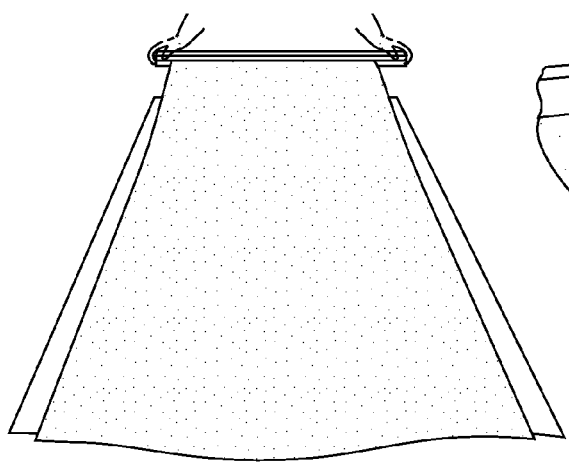
Figure 2D:
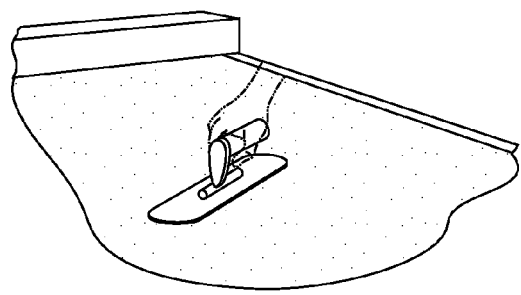
Figure 2E:
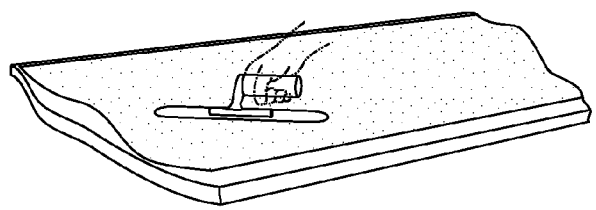
Figure 2F:
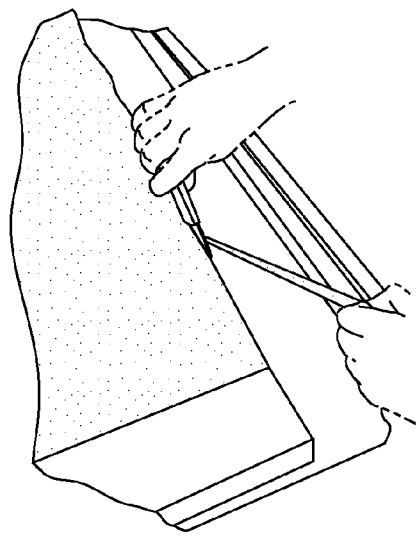
Figure 2G:
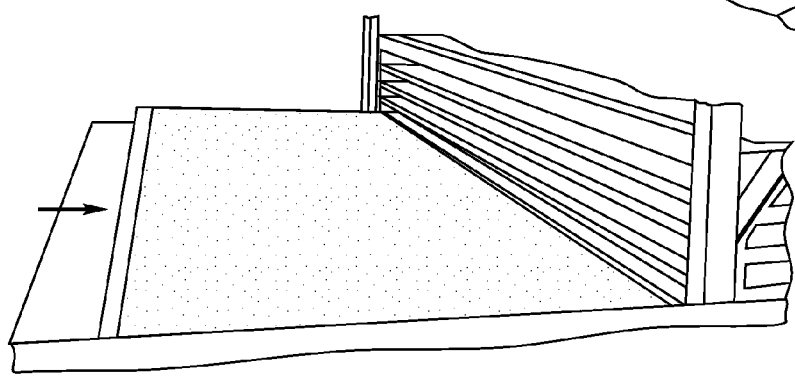
Figure 2H:
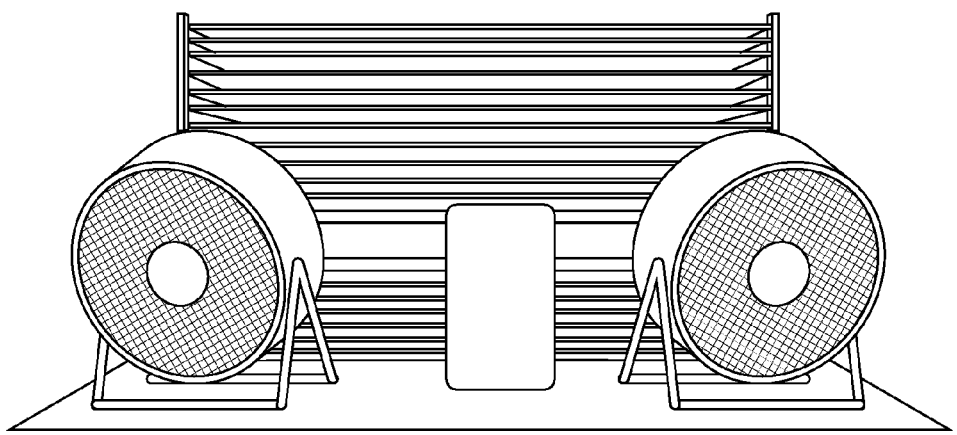
Figure 2I:
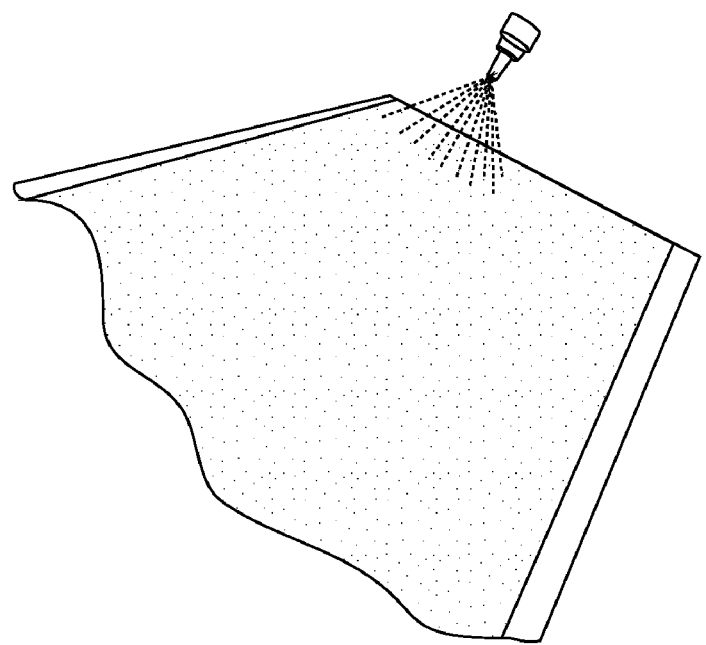
Figure 2J:
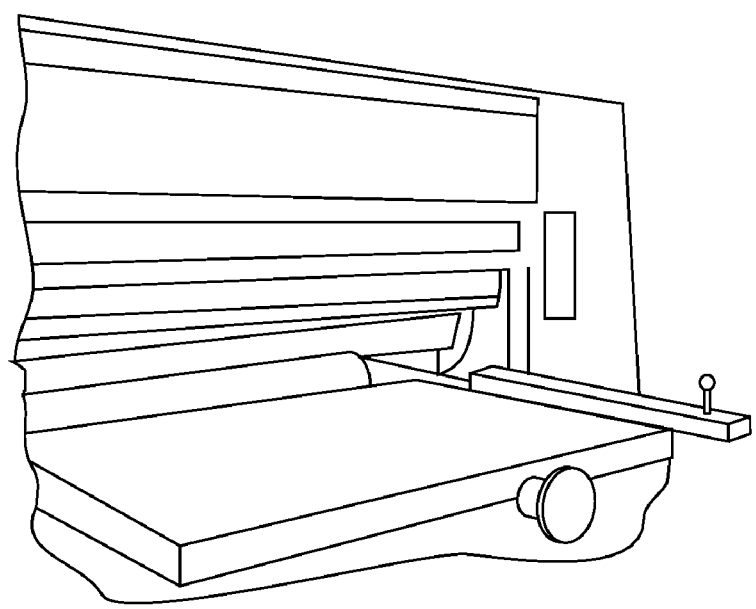

Referring now to the drawings wherein like reference numerals are used to identify identical or similar components in the various views, FIG. 1 illustrates the steps of mud application to a fabric substrate 10. "Mud" is the term typically utilized in the building trades. In order to manufacture weathered stone according to the present invention, as a first step, the following ingredients may be mixed to make the base mud mixture: wood glue, lightweight sheet rock compound, standard weight sheet rock compound, and plaster of paris. An exemplary composition for the base mud mixture may include: one (1) gallon ELMER'S® or ELMER'S PROFESSIONAL® wood glue, two (2) boxes of lightweight sheet rock compound, two (2) boxes of standard weight sheet rock compound; and one (1) quart powdered plaster of paris.

FIGS. 2a to 2j are illustrative views of some of the stages of preparing a stone panel in accordance with the present invention: (a) roll of fabric substrate; (b) a PASTE-WELL machine; (c) pulling fabric substrate through PASTE-WELL machine; (d) applying texture; (e) applying texture; (f) trimming excess; (g) sliding panel into rack; (h) letting panels dry in racks under light air movement; (i) spraying panels with acrylic; and (j) cutting panels to size.

As compared to the original formula for stone which used only standard weight sheet rock compound, the present invention utilizes added ingredients. For example, ELMER'S® brand wood glue allows the mixture to stick to the substrate with greater adhesion. The sheet rock compound applied to the substrate may include gypsum to give the product strength and flexibility. Using wood glue in the base mud mixture gives the gypsum greater adhesion to the substrate, making the product more stable during installation. When the base mud mixture is hardened, it will prevent sloughing off of any material from the substrate, so that the substrate may be manipulated to create cracks to simulate an aged stone block. ELMER'S® brand is preferred because it will soften during installation, thus allowing the product to be pliable. Lightweight sheet rock compound is used to make the final product lighter and less expensive to ship. In an exemplary embodiment, only lightweight sheet rock may be used. In a preferred embodiment, lightweight and standard weight sheet rock are preferably mixed because even though use of only lightweight sheet rock will minimize weight, the lightweight has a grain to it, and using only lightweight sheet rock may negatively effect the texture of the final product. In the exemplary embodiment where lightweight and standard weight sheet rock are mixed, the standard weight is smoother and delivers the desired smoothness to the final product. The addition of plaster of paris to the mud mixture facilitates faster drying of the panels.

For the second step, a two-stage application method may be used to apply the mud mixture to a woven cotton fabric substrate. The substrate 10 may be the OSNABURG™ substrate from Cady industries in Memphis, Tenn. Substrate 10 may also comprise burlap, as in the standard manufacturing formula. Substrate 10 may also comprise natural fibers such as jute or hemp, or synthetic or polymer materials. However, a woven cotton fabric substrate, such as OSNABURG™ substrate is preferred because it is lighter and has less texture than burlap, and thus provides a smoother, lighter product. Substrate 10 may have an exemplary dimension of 36" wide. Referring now to FIG. 1, substrate 10 is shown as a roll of OSNABURG™ on a spindle.

The mud mixture may be applied to the fabric substrate 10 in the manner illustrated in FIG. 1. In particular, the mud mixture is deposited in one or more PASTE-WELL™ machines 20, 30. PASTE-WELL™ machines 20, 30 and their operation may be generally known in the relevant art. Generally, each PASTE-WELL™ machine 20, 30 may be clamped to a sturdy flat surface. Each PASTE WELL™ 20, 30 may include a pan over which substrate 10 is fed face down under a front panel of the PASTE-WELL™ machine. The pan and front panel together form a well into which the mud mixture is poured directly onto the back of substrate 10. The PASTE-WELL™ machines 20, 30 may include a wiper screen attached to the bottom of the front panel in order to improve the smoothness of application of the mud mixture to substrate 10.

The PASTE-WELL™ machines 20, 30 may include front panel adjustment knobs that allow a user to set a desired paste thickness. Referring again to FIG. 1, the first PASTE-WELL™ 20 in series may be set tight with a higher pressure of the front panel. The higher pressure is provided so as to push the mud mixture into the fabric substrate 10. The second PASTE-WELL™ 30 in the series may be set with a looser pressure of the front panel in order to provide the desired thickness of the final product. Pressure of the front panel may be loosened by rotating the adjustment screws of the PASTE-WELL™ 30. In an exemplary embodiment, the mud mixture may be applied at a thickness of no less than 0.0156 inches and no more than 0.1 inches. If the mud mixture is applied at a thickness greater than 0.1 inches, the product loses pliability during installation. If the mud mixture is applied at a thickness less than 0.0156 inches, the texture of the fabric substrate 10 will become visible.

Once fabric substrate 10 is pulled through the first and second PASTE-WELL™ machines, the product exits onto a flat panel 40 and the substrate is cut, so that the resulting product may be of a desired size. For example only, a desired size may be 35"×104", but it is understood by those of ordinary skill in the art that any number of sizes may be desired. The substrate may be cut by a cutting bar located on PASTE-WELL™ 20, 30. In an exemplary embodiment, flat panel 40 may be comprised of ¾" square steel tube and galvanized sheet metal, and may be 40"×108", for example. Texture may be hand-applied to the product using a rounded cement trowel. The excess mud mixture may be trimmed using a cutting blade, as known in the relevant art.

For the third step, the panels may be stacked in a shelf system, and then dried overnight with fans and dehumidifiers or light air movement. In an exemplary embodiment, the panels are dried at no more than 65% humidity and no less than 50° F. If the panels are not completely dry before coated with sealer, they may be ruined.

For the fourth step, MINIWAX™ brand polycrylic semi gloss may be sprayed on the panels. In an exemplary embodiment, the polycrylic semi gloss may be sprayed at a rate of approximately 0.0022 gallons per square foot. MINIWAX™ brand polycrylic is an example of a clear acrylic that may be sprayed onto the panels, but it is to be understood by one of ordinary skill in the art that various other brands of clear acrylics may used and remain within the spirit and scope of the invention. Thereafter, the panels may be dried overnight using fans and dehumidifiers or other light air movement. In an exemplary embodiment, the panels are dried at no more than 65% humidity and no less than 50° F. If the panels are not completely dry before being cut, they may become ruined. While conventional methods use MINIWAX™ brand polyurethane, this may create a yellowing effect caused by the oil base clear coats. The use of the acrylic base in place of MINIWAX™ brand polyurethane reduces the yellowing effect caused by oil base clear coats. The acrylic base is also more pliable and makes the product easier to install. More specifically, the use of acrylic and latex sealers gives the panels of the final product the ability to wrap around during installation without continuing to produce undesired cracks in the final product.

For the fifth step, the 35"×104" panels may be stacked and cut to different preferred sizes using a paper guillotine. The standard sizes may be 33"×33", 24"×33", and 48"×33," but it is to be understood by one of ordinary skill in the art that the panels may be cut to various other sizes and remain within the spirit and scope of the invention. A circular saw with a masonry blade may be used to cut the panels to size.

For the sixth step, the panels may be "beat up" by hand. This gives the cracking effect of ancient stone. Any method of stressing the panel to produce cracking may be utilized. The length of time devoted to stressing the panels or the time interval between stresses to cause cracking may be varied as required to achieve the desired look. The product must dry completely before any cracking occurs. The appearance of cracks may further add to the aesthetically pleasing quality of the panels, as long as the integrity of the material is maintained so that material does not fall off.

For the seventh step, a glaze may be used to color the panels. Most of the glazes are made of an oil based paint, mineral spirits, PENETROL® paint conditioner, and polyurethane. The glazes may comprise various compositions depending upon the desired color for the panels. There are two distinct methods for applying the glazes according to the present invention. The first method involves using a rag to apply the glaze, using a stippling brush to work the glaze into all the cracks, and then using a clean rag to wipe the glaze off. This method stains the panel to the desired color. The second method involves applying the glaze with a rag and then using a stippling brush to blend the glaze to the desired color. The panels may then be allowed to dry overnight. Second or third applications of glaze may be used as required to achieve a desired look.

Any of numerous finishes may be applied to the panels by one or more spray nozzle means or brushes or rollers. Finishes include latex or oil based compositions, such as, but not limited to: latex or oil based primers, latex or oil based stains, glazes, or lacquer compositions. Accordingly, conventional clear or pigmented finishes may be applied to the surface of a panel layer to provide desired coloring and protection. There are any number of possible combinations of finishes that may be applied. For example, a first coating may include a latex primer, a second coating may include a flat enamel, and a third coating may include a stain and sealer.

Once the aforementioned panels have been created, the panels may be installed on walls using a standard heavy-duty clear wall-covering adhesive. In order to produce a superior visual effect once the panels have been installed, a mortar mix or grout may be applied to the spaces between adjacent panels. The mortar mix may comprise lightweight quick spackle and acrylic or latex paint. A preferred quick spackle may be LIGHTWEIGHT SPACKLE™ produced by Custom Building Products or FAST 'N'FINAL® produced by Dap. In an exemplary embodiment, the seams may be finished with a grout being made of approximately 1 gallon of lightweight spackling, and approximately 1 cup of colored acrylic paint.

In order to install the aforementioned panels on floors and countertops, glue and clear coat is preferably used such that the weathered stone according to the present invention is durable enough for practical use on floors and countertops. The glue may be water based but dries waterproof and to the consistency of hard plastic. The glue soaks into the backing and mud. This softens the product making it easier to install. Once the glue dries, it hardens the product. The addition of clear coat seals the product.

The formula for glue according to the present invention is, approximately 90% GLASCOL® C-47 from Ciba Specialty chemicals, approximately 10% FLOTROL™ from Home Depot. The formula for the clear coat according to the present invention is, approximately 95% GLASCOL® C-47 from Ciba Specialty Chemicals, and approximately 5% Trimethyl pentanediol monoisobutrate from Aldrich Chemical Company.

In an exemplary embodiment, an epoxy coating may be applied to the weathered stone panel. The epoxy coating may be applied by brush, roller, or spray application. In addition, the epoxy coating may be poured onto the panels. The epoxy coating may be crystal clear and non-yellowing. The epoxy coating may isolate the panels from moisture, enabling the product to be waterproof so that it may be used in applications such as flooring, countertops, shower stalls, and any other applications in which the panels may be exposed to water.

Panels may be installed so that cracks, mimicking the effects of ancient stone, are not continuous from one panel to another. In an exemplary embodiment, the panels are completely random in texture, cracks, and color tone.

It would be apparent to those skilled in the art in view of this disclosure that the various products, such as the use of the OSNABURG™ substrate, or MINIWAX™ products, are discussed for exemplary purposes only, and that other like products may be used for the weathered stone according to the present invention.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A method of manufacturing a simulated stone panel, said method comprising:
    preparing a base mixture comprising wood glue, plaster of paris, and lightweight sheet rock compound; and
    applying said base mixture to a substrate.

2. A method according to claim 1 further comprising the steps of:
    cutting said substrate to create panels of a desired size;
    applying air movement to said panels until said panels are dry;
    applying an acrylic base to said panels;
    applying air movement to said panels until said panels are dry;
    cutting said panels;
    manipulating said panels by hand until at least one crack is created in each panel;
    applying a glaze to said panels for coloring; and
    drying said panels.

3. A method according to claim 2 wherein said air movement is applied at no more than approximately 65% humidity and no less than approximately 50° F.

4. A method according to claim 2 wherein said acrylic base comprises a clear acrylic base.

5. A method according to claim 2 wherein said desired size is less than or equal to approximately 40"×108".

6. A method according to claim 2 wherein said glaze comprises: oil base paint, mineral spirits, paint conditioner, and polyurethane.

7. A method according to claim 2 wherein said step of applying a glaze to said panels for coloring further comprises the substeps of:
    applying said glaze with a rag;
    using a stippling brush to work said glaze into said cracks; and
    using a clean rag to wipe off said glaze.

8. A method according to claim 2 further comprising the steps of:
    applying a second coating of said glaze to said panels; and
    drying said panels.

9. A method according to claim 1 further comprising the step of:
    applying an acrylic base to said panel.

10. A method according to claim 1 further comprising the step of:
    manipulating said panel by hand until at least one crack is created in said panel.

11. A method according to claim 1 further comprising the step of:
    applying a glaze to said panel for coloring.

12. A method according to claim 1 wherein said base mixture further comprises standard weight sheet rock compound.

13. A method according to claim 12 wherein said base mixture is comprised of the following ingredients in about the following ratio: approximately 1 gallon wood glue: approximately 7 gallons lightweight sheet rock compound: approximately 7 gallons standard weight sheet rock compound: approximately 1 quart powdered plaster of paris.

14. A method according to claim 1 wherein said substrate is comprised of woven cotton fabric.

15. A method according to claim 1 wherein said base mixture is applied to said substrate at a thickness of about 0.0156 to 0.1 inches.

16. A method according to claim 1 wherein said step of applying said base mixture to said substrate further comprises the substeps of:
    feeding a roll of said substrate through a first paste-well machine at a first pressure for pushing said base mixture into said substrate;
    feeding said roll of said substrate through a second paste-well machine at a second pressure, said second pressure lower than said first pressure, for achieving a desired thickness of said base mixture on said substrate; and
    applying pressure to said substrate by hand with a trowel.

17. A method according to claim 1 further comprising the step of applying an epoxy coating to said panels for waterproof applications.

18. A method of installing a stimulated stone panel produced by the method of claim 1 on a floor or countertop, said method comprising:
    applying a glue to said panel;
    applying said panel to said floor or countertop; and
    applying a clear coating to said panel for sealing said product.

* * * * *